US007561020B2

(12) United States Patent
Fitzgibbon

(10) Patent No.: US 7,561,020 B2
(45) **Date of Patent: *Jul. 14, 2009**

(54) SYSTEM AND METHOD FOR USING OPERATOR AS A REPEATER

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 265 days.

This patent is subject to a terminal disclaimer.

(21) Appl. No.: 11/167,895

(22) Filed: Jun. 27, 2005

(65) Prior Publication Data

US 2006/0290467 A1 Dec. 28, 2006

(51) Int. Cl.
*G05B 19/00* (2006.01)

(52) U.S. Cl. ...................... 340/5.7; 340/5.71; 340/5.61; 340/5.64; 340/825.69

(58) Field of Classification Search ................ 340/5.71, 340/825.72, 825.69, 5.8, 545.1, 5.65, 5.64, 340/5.22, 10.3, 521; 455/420, 100, 11.1
See application file for complete search history.

(56) References Cited

U.S. PATENT DOCUMENTS

| | | | | |
|---|---|---|---|---|
| 2,292,387 | A | 8/1942 | Markey et al. | |
| 3,870,959 | A | 3/1975 | Wootton | |
| 3,950,099 | A | 4/1976 | Malueg | |
| 5,297,211 | A | 3/1994 | Noro | |
| 5,549,113 | A | 8/1996 | Halleck et al. | |
| 5,746,133 | A | 5/1998 | Widmer et al. | |
| 6,005,508 | A | 12/1999 | Tsui | |
| 6,049,289 | A | 4/2000 | Waggamon et al. | |
| 6,181,255 | B1 | 1/2001 | Crimmins et al. | |
| 6,333,698 | B1 | 12/2001 | Roddy | |
| 6,400,968 | B1 * | 6/2002 | White et al. | 455/572 |
| 6,424,819 | B1 * | 7/2002 | Yan | 455/11.1 |
| 6,525,645 | B2 | 2/2003 | King et al. | |
| 6,693,542 | B2 | 2/2004 | Hasegawa | |
| 6,822,603 | B1 | 11/2004 | Crimmins et al. | |
| 6,903,650 | B2 | 6/2005 | Murray | |
| 6,946,973 | B1 | 9/2005 | Yanda | |
| 7,142,849 | B2 * | 11/2006 | Neuman | 455/420 |

(Continued)

FOREIGN PATENT DOCUMENTS

WO WO 01/09691 2/2001

OTHER PUBLICATIONS

International Search Report from PCT/US06/25021.

(Continued)

*Primary Examiner*—Edwin C Holloway, III
(74) *Attorney, Agent, or Firm*—Fitch Even Tabin & Flannery

(57) ABSTRACT

A moveable barrier operator that is used as a repeater includes a receiver device having an input, a transmitter device having an output, an apparatus responsive to predetermined signals received by the receiver for controlling the position of a barrier; and a controller. The controller is coupled to the receiver device and the transmitter device and controller is programmed to receive a signal from a signaling actuation device at the input of the receiver device. The controller is programmed to responsively re-transmit the signal to at least one other moveable barrier operator from the output of the transmitter device when indicated by the signal.

27 Claims, 4 Drawing Sheets

U.S. PATENT DOCUMENTS

| | | | | |
|---|---|---|---|---|
| 7,183,940 | B2 * | 2/2007 | Chuey | 340/825.69 |
| 2002/0168001 | A1 | 11/2002 | Ramsey | |
| 2004/0036573 | A1 * | 2/2004 | Fitzgibbon et al. | 340/5.64 |
| 2004/0092837 | A1 | 5/2004 | MacGregor | |
| 2004/0252030 | A1 | 12/2004 | Trimble et al. | |
| 2006/0109079 | A1 | 5/2006 | Mack | |

OTHER PUBLICATIONS

Diversity Reception and the Hallicrafters DD-1; http://radioblvd.com/diversity DD1.html; First published on Oct. 9, 2002.

* cited by examiner

SYSTEM AND METHOD FOR USING OPERATOR AS A REPEATER

FIELD OF THE INVENTION

The field of the invention relates to moveable barrier operators and, more specifically, to transmitting signals to moveable barrier operators.

BACKGROUND

Different types of moveable barrier operators have been sold over the years and these systems have been used to actuate various types of moveable barriers. For example, garage door operators have been used to move garage doors and gate operators have been used to open and close gates.

Such barrier movement operators may include a wall control unit, which is connected to send signals to a head unit thereby causing the head unit to open and close the barrier. In addition, these operators often include a receiver unit at the head unit to receive wireless transmissions from a hand-held code transmitter or from a keypad transmitter, which may be affixed to the outside of the area closed by the barrier or other structure.

Moveable barrier operators are typically actuated when a signaling actuation device (such as a portable transmitter) is positioned to be within the range of the operator. For instance, when a user is attempting to enter their home garage by using a portable transmitter, the user has to first position the portable transmitter within the wireless operating range of the garage door operator to be controlled before the door can be moved and the garage can be entered.

Frequently, however, transmitters have limited ranges due largely to government regulations of their power and thus operators have a very limited reception range. Because of the limited range of operators, problems can occur. For instance, if the user is in a vehicle, the vehicle must be first positioned to be within close proximity of the operator, the transmitter must be actuated, and then the user must wait until the door is opened before the user can enter the garage. The time lag between transmitter actuation and barrier movement may create security and convenience problems as the user has to wait in their vehicle for the door to be opened. In other situations, since users may be unsure as to when the transmitter has come within range of the operator, users often actuate their transmitters many times before the door is opened. This problem leads to user frustration and inefficient system operation as the battery-life of the transmitter is degraded by repeated and useless actuations of the operator.

SUMMARY

A system and method are provided that use moveable barrier operators to re-transmit actuation signals sent by an originating signaling actuation device. The signals are re-transmitted from operator to operator thereby allowing a barrier to be moved even though the transmitter is located outside the operating range of the particular operator that moves the barrier. Consequently, the actuation device achieves a significantly greater operating range from which to actuate the operator and move the barrier. User convenience and security are also enhanced.

In accordance with the principles described herein, a moveable barrier operator is used as a repeater. The operator includes a receiver device having an input, a transmitter device having an output, an apparatus responsive to predetermined signals received by the receiver for controlling the position of a barrier, and a controller. The controller is coupled to the receiver device and the transmitter device. The controller is programmed to receive a signal from a signaling actuation device via the receiver device and to responsively re-transmit the signal to at least one other moveable barrier operator via the transmitter device when indicated to do so by information contained in the signal.

The signal may comprise a signal content and a carrier frequency. The controller may be programmed to re-transmit the signal from the transmitter device without substantially altering the carrier frequency of the received signal or to re-transmit the signal from the transmitter device with a different carrier frequency than the frequency of the incoming signal. Conveniently, the controller may also increment or otherwise update a count of re-transmissions of the signal in a marker that is included in the re-transmitted signal. In this case, the controller may also be programmed to halt the re-transmission of the signal when the count reaches a predetermined threshold.

In other embodiments, the controller may be programmed to delay the re-transmitting of the signal for a time period that is related to a signal strength of the signal. The controller may also be programmed to re-transmit the signal after a delay period from when the signal has been entirely received. The delay period may be determined by a characteristic such as a fixed length time interval, a signal strength, or information contained within the transmission. Other examples of characteristics are possible.

Thus, a system and method are presented that re-transmit signals from operator to operator thereby increasing the effective range of barrier actuating devices. Consequently, a barrier operator can be actuated from a distance that may be out of the operating range of its associated operator, thereby increasing user convenience with the system. In addition, efficiency of the system is also enhanced since the operator can be activated by one user actuation rather than by repeated attempts.

Skilled artisans will appreciate that elements in the figures are illustrated for ease of understanding and have not necessarily been drawn to scale. For example, the dimensions of some of the elements in the figures may be exaggerated relative to other elements to help to improve understanding of various embodiments of the present invention. Also, common but well-understood elements that are useful in a commercially feasible embodiment are often not depicted in order to facilitate a less obstructed view of the various embodiments of the present invention.

DESCRIPTION

Figure 1:
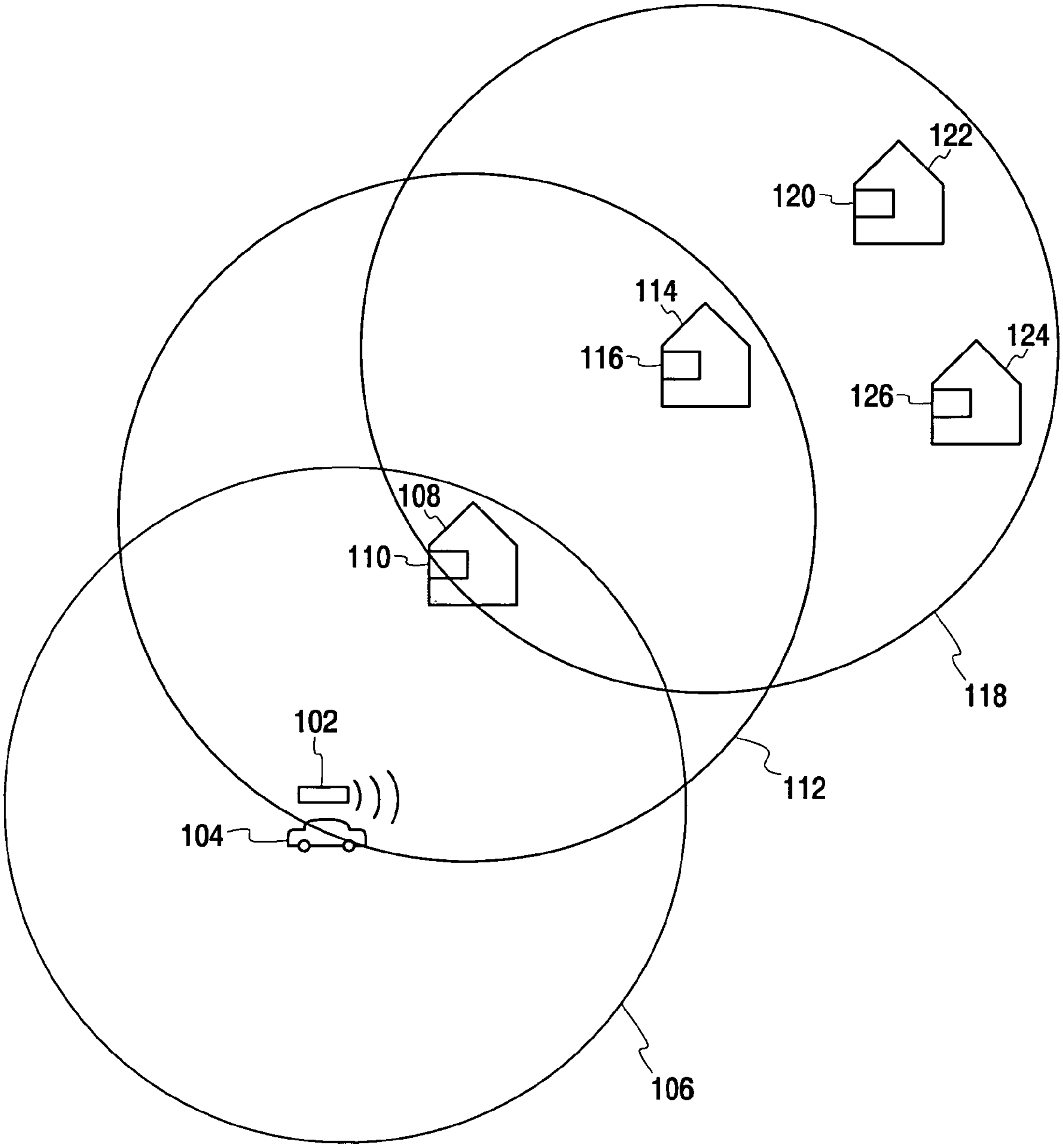
FIG. 1 is a block diagram of a system of moveable barriers that act as repeaters according to the present invention.

Referring now to the drawings and especially FIG. 1, a system and method for using a moveable barrier operator as a repeater is described. In the example of FIG. 1 and the other examples described herein, it will be understood that the ranges indicated and described are transmission ranges of an operator or transmitter. However, it will be understood that the transmission and reception ranges of the operator are related and that the actual reception range of an operator may either be the same or different than the transmission range of an operator. In addition, although the examples herein are described as utilizing Radio Frequency (RF) signals, it will be realized that any type of electromagnetic or sonic signal may be used.

A portable transmitter 102 transmits a signal that is used to actuate an operator. The transmitter 102 may be carried in a vehicle 104 and has a transmission range 106. The transmitter 102 may be any type of signaling actuation device such as a garage door opener or gate opener. Other examples of transmitters are possible.

The transmitter 102 has a home operator 120 that is located in a garage 122. The signals transmitted by the transmitter 102 include signal content (e.g., a security code) that allow the operator 122 to be actuated. Consequently, operators other than the operator 120 are not enabled by the content of the signal (e.g., by the security code) and will not be actuated by the signal. In addition, the signals include a carrier frequency. As described herein, the carrier frequency of the re-transmitted signal may be adjusted to be different than the carrier frequency of the incoming signal.

In one example of the operation of the system of FIG. 1, the transmitter 102 transmits a signal from the vehicle 104, but, as shown, the range 106 of transmitter 102 does not include the home operator 120. However, an operator 110 (positioned within a garage 108) is within the range 106 and the signal is received by this first operator. Since the signal does not actuate the operator 110 (because the signal includes a security code of the operator 120), the signal is then re-transmitted by the operator 110.

The operator 110 has a transmission range 112 and this range includes an operator 116, which is located within a garage 114. Since the signal does not actuate the operator 116, the signal is re-transmitted by the operator 116.

The operator 116 has a transmission range 118 and within this range are positioned operators 120 and 126 (in garages 122 and 124, respectively). The signal, after being received at the operators 120 and 126, is analyzed to determine whether it can actuate the barriers at these locations. The signal does not actuate the operator 126 at the garage 124 because it includes a security code of the operator 120. However, the signal actuates the operator 120, since the signal includes the proper security code. Consequently, the operator 120 can move the barrier at the garage 122.

Conveniently, there may be an upper limit to the number of times that the signal is re-transmitted by operators. For example, a controller within an operator may increment or update a count that is stored as a marker in the signal and re-transmit the signal with the incremented or updated count. When the count becomes greater than a predetermined threshold, then re-transmissions of the signal may be halted. In the example of FIG. 1, if the maximum re-transmission threshold is set to two, when the signal reaches the operators 120 and 126, re-transmissions will be halted by these operators because the maximum count has been reached.

Halting the re-transmissions is advantageous for several reasons. For instance, halting re-transmissions prevents an infinite number of re-transmissions from being made if a circle of operators exists and the re-transmissions follow an endless circular path around transmitters. In another example, security concerns may exist when the portable transmitter and its owner are too far from the barrier when the transmitter is actuated (i.e, too many re-transmissions need to be made to reach the home operator).

Figure 2:
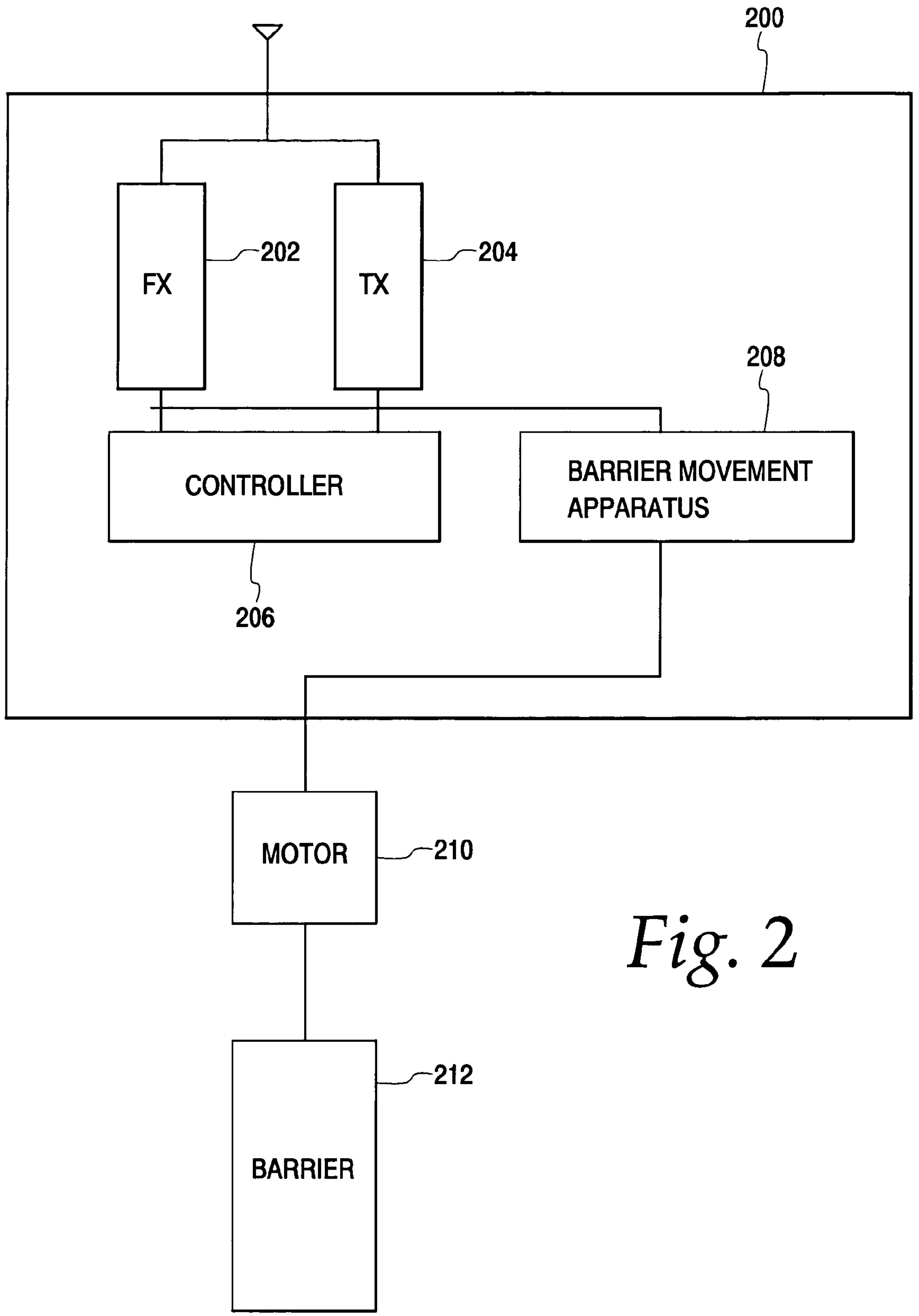
FIG. 2 is a block diagram of a moveable barrier operator according to the present invention.

Referring now to FIG. 2, a barrier operator 200 that is used as a repeater is described. The barrier operator 200 includes a receiver device 202, a transmitter device 204, a controller 206, and a barrier movement apparatus 208.

The controller 206 is coupled to the receiver device 202 and the transmitter device 204. The controller 206 is programmed to receive a signal from a signaling actuation device at the input of the receiver device 202 and to responsively re-transmit the signal to at least one other moveable barrier operator from the output of the transmitter device 204 when indicated to do so by the signal.

The controller 206 may be programmed to re-transmit the signal from the transmitter device 204 without substantially altering the frequency of the signal or to re-transmit the signal from the transmitter device 204 with a different frequency of the signal. Conveniently, the controller 206 may increment or otherwise update a count of the re-transmissions of the signal that is stored as a marker in the signal and re-transmit the signal with the incremented or updated count. In this case, the controller 206 may be programmed to halt the re-transmission of the signal when the count reaches a predetermined threshold.

In other examples, the controller 206 may be programmed to delay the re-transmitting for a time period that is related to a signal strength of the signal. The controller 206 may be programmed to re-transmit the signal after a delay period from when the signal has been entirely received. The delay period may be determined by a characteristic such as a fixed length time interval, a signal strength, or information contained within the transmission.

As shown, the barrier movement apparatus 208 is coupled to a motor 210, which in turn is coupled to a barrier 212. The barrier movement apparatus 208 can determine when to actuate the motor 210 in order to move the barrier 212. In one example, when it is determined by the controller 206 that a received signal is requesting that the barrier 212 be moved, the controller 206 may produce a control signal that is received by the barrier movement apparatus 208. The barrier movement apparatus 208 then activates the motor 210 to move the barrier 212.

The transmitter device 202 may be a multiple frequency transmitter circuit. In this regard, it may comprise two transmitter circuits each of which is configured to transmit security codes at a predetermined frequency. For example, the transmitter device 202 may transmit signals at 315 MHZ and at 390 MHZ. To send a security code in a signal, the controller 206 transmits the digits of the security code to transmitter device 202. The security code is applied to both transmitter circuits and is thus, contemporaneously transmitted at 315 MHZ and 390 MHZ.

In another example, a single frequency agile transmitter circuit may be used to transmit signals, including security codes at multiple frequencies. When a security code is to be transmitted using the transmitter, the controller 206 pre-sets the transmitter to transmit at a first RF frequency (e.g., 315 MHZ) and sends the digits of a security code portion to the configured transmitter 202. When the transmission at the first frequency is completed, the controller 206 controls the transmitter 202 to transmit at the second RF frequency (e.g., 390 MHZ).

The receiver device 202 may also be configured to receive multiple frequencies. In this regard, the receiver device 202 may comprise two fixed frequency receiver circuits. The controller 206 periodically surveys reception by the receiver circuits to determine whether a security code may be being received at their respective frequencies and, if so, controller 206 accumulates received security code digits. In another example, the receiver 204 includes one frequency agile receiver circuit, which may be periodically switched back and forth to receive security codes at the possible frequencies of reception. In the present example, receiver 204 is alternatively switched between 315 MHZ and 390 MHZ to identify security codes at one or both of those frequencies.

Although the above example is described in terms of frequencies of 315 and 390 MHZ, it will be realized that any frequency can be used. In addition, although the above example is described in terms of using only two frequencies, it will be understood that any number of frequencies can be used.

Figure 3:
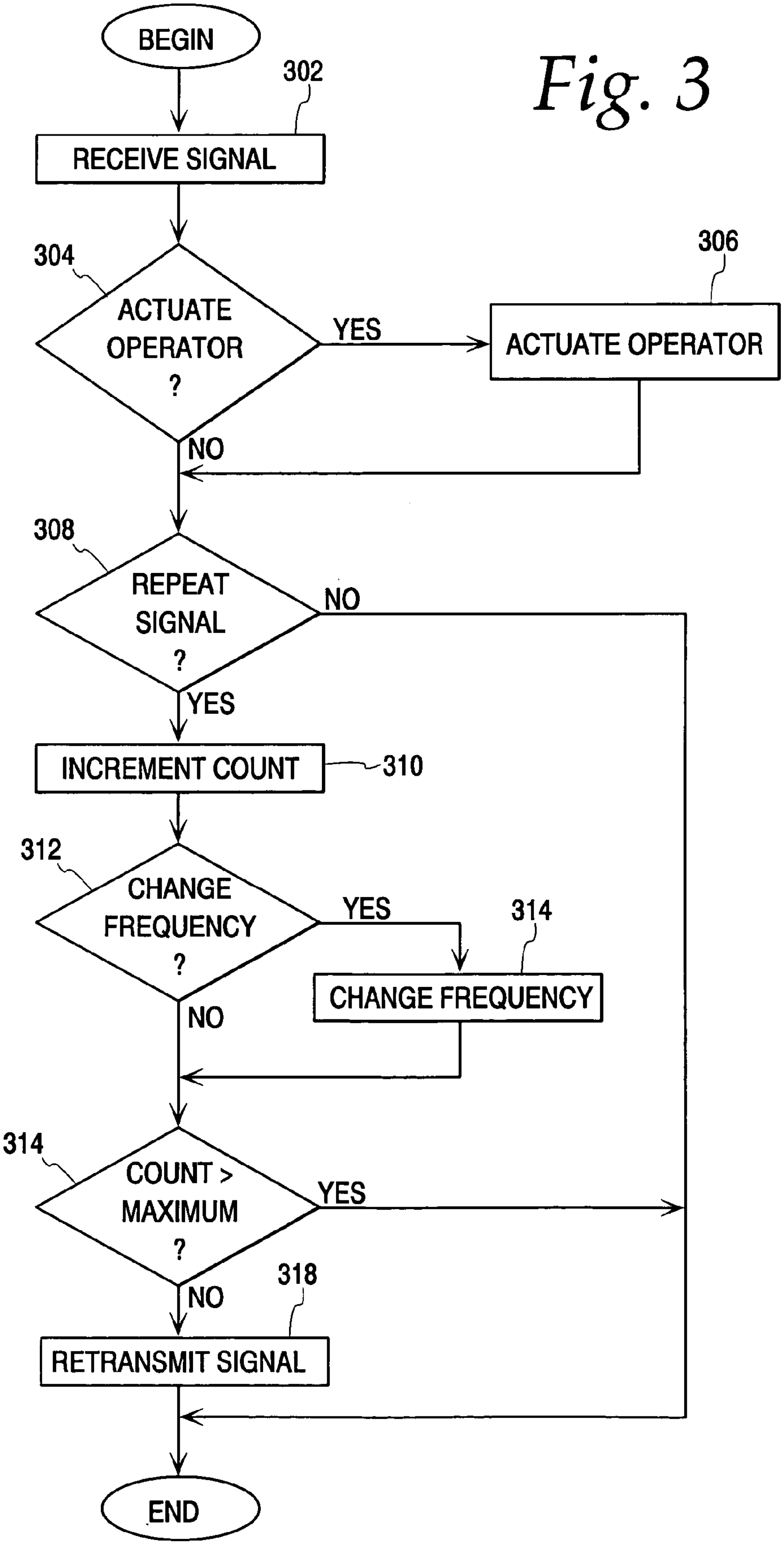
FIG. 3 is a flowchart of an approach for operating a moveable barrier operator according to the present invention.

Referring now to FIG. 3, one example of an approach for operating a moveable barrier operator is described. At step 302, the operator receives a signal. At step 304, the operator determines whether to use the signal to actuate the operator. If the answer is affirmative, at step 306, the signal is used to actuate the operator. If the answer is negative, execution continues at step 308.

At step 308, it is determined whether the signal should be potentially re-transmitted based upon information contained in the signal. For example, this may be done by comparing a security code in the signal to the code associated with the barrier. If a match does not exist, the signal may be potentially re-transmitted (if other conditions are met). If the answer is negative, then execution ends. If the answer is affirmative, then execution continues at step 310. At step 310, a count of the number of re-transmissions is incremented. At step 312, it is determined whether to change the frequency of the re-transmitted signal. If the answer is affirmative, at step 314, the frequency of the signal is changed. If the answer is negative, at step 316, it is determined whether the count has reached a value that is greater than a maximum predetermined threshold. If the answer is affirmative, then execution ends. If the answer is negative, then at step 318, the signal is re-transmitted.

Figure 4:
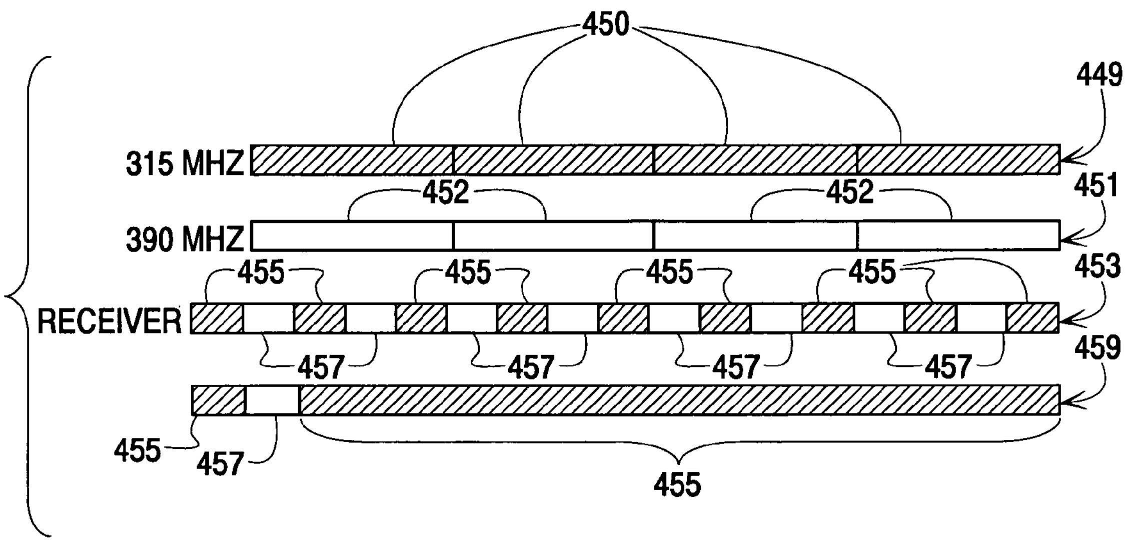
FIG. 4 is a graphical representation of the RF transmission and reception of security code portions of a signal according to the present invention.

Referring now to FIG. 4, one example the operation of an operator to transmit and receive security codes using multiple frequencies is described. The top line 449 of FIG. 4 represents the reception of security codes at 315 MHZ while the second line 451 represents the reception of security codes at 390 MHZ. As illustrated by line 449, the individual segments 450 represent security code portions as do the individual segments 452 of line 451. Transmission and reception at 315 MHZ (line 449) is given a cross-hatched appearance while transmission and reception at 390 MHZ is not and is represented as open space between segments. Line 453 represents the time during which the operator is detecting signals transmitted at the two frequencies on line 453 the time for detecting 315 MHZ signals is represented as cross hatched times 455 and the timing for detecting signals transmitted at 390 MHZ is represented as plane time segments 457. Reception may alternate between the two frequencies and when appropriate digits are detected, it connects to the single frequency at which the digits were first detected to accumulate the transmitted security code portions. In this way, when one frequency is being interfered with, the security code at the other frequency will be detected. The switch from alternating between frequencies being detected and a constant detection of signals transmitted at 315 MHZ is represented at line 459 of FIG. 4.

Figure 5:
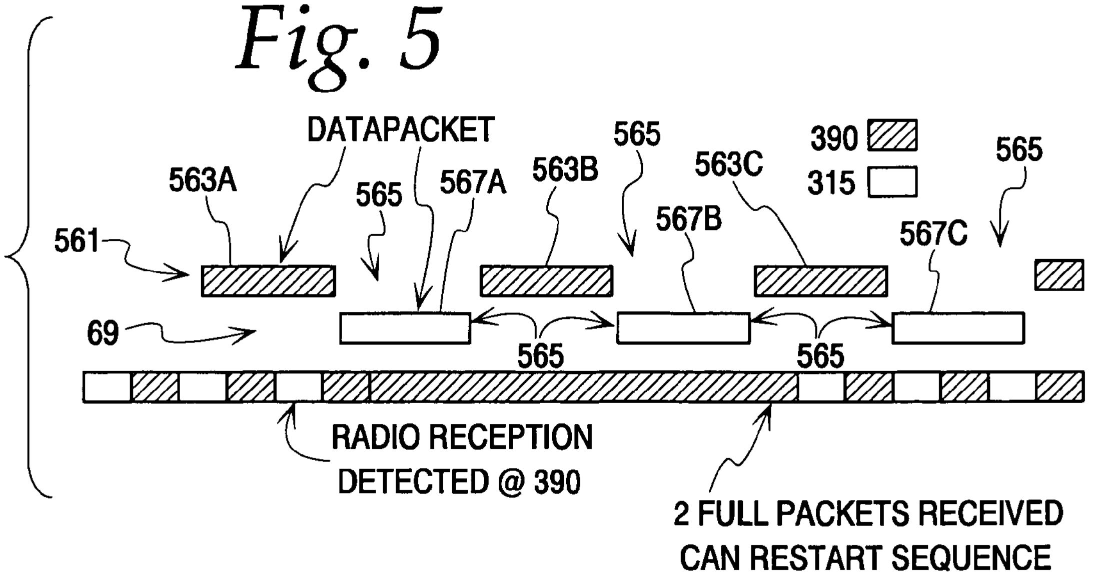
FIG. 5 is a graphical representation of an alternative to the transmission and reception shown in FIG. 4 according to the present invention.

It may be desirable to transmit security codes with time spacing between the transmission of security code portions as is illustrated at line 561 of FIG. 5. In the example, security code portions are transmitted for a period of approximately 40 msec (563) with an approximately 60 msec guard time 565. Line 561 represents transmission at 315 MHZ. Security code portions are also transmitted at 390 MHZ in 40 msec transmissions 567 separated by approximately 60 msec (565) of no transmission. Advantageously, the transmission at one frequency occurs during the non-transmission at the other frequency.

As represented in FIG. 5, the active transmission of security code portions at 315 MHZ (563*a*, 563*b*, 563*c*) occurs when active transmission at 390 MHZ (567*a*, 567*b* and 567*c*) is not occurring. In this way, the security codes can be contemporaneously transmitted in a non-interfering manner simplifying the use of frequency agile transmitter and receiver circuits. Also, substantially the same code portion will be transmitted as shown by the couplets (563*a*,567*a*); (563*b*, 567*b*) and (563*c*, 567*c*). The reception of transmission is similar to that shown in FIG. 4 in that when valid code digits are found at one frequency e.g., 315 MHZ, the reception may convert to that frequency alone for further reception.

Thus, a system and method are provided that re-transmit signals from operator to operator thereby increasing the effective range of transmitters. Consequently, a barrier can be actuated from a substantial distance that may be out of range of its associated operator thereby increasing efficiency and reliability of the system.

While there has been illustrated and described particular embodiments of the present invention, it will be appreciated that numerous changes and modifications will occur to those skilled in the art, and it is intended in the appended claims to cover all those changes and modifications which fall within the true scope of the present invention.

What is claimed is:

1. A moveable barrier operator configured to be operated in an area enclosed by a moveable barrier, the moveable barrier operator comprising:

a receiver device configured to receive signals at multiple frequencies at the moveable barrier operator, which receiver receives incoming signals at the moveable barrier operator and which incoming signals include a security code;

a transmitter device configured to transmit signals at multiple frequencies, the transmitter device at the moveable barrier operator which transmitter device transmits the incoming signals and which incoming signals include the security code;

a barrier positioning apparatus at the moveable barrier operator, the barrier positioning apparatus configured to be responsive at a plurality of frequencies to the incoming signals which include the security code and which incoming signals are received by the receiver to control the position of a barrier; and a controller at the moveable barrier operator, the controller coupled to the receiver device and the transmitter device, the controller being programmed to receive a received signal from the receiver device and being programmed to responsively re-transmit the received signal as second signals to at least one other moveable barrier operator from the transmitter device when indicated by the signal, the at least one other moveable barrier operator configured to be operated in a second area enclosed by at least one other moveable barrier and the at least one other moveable barrier operator configured responsively receive, recognize the security code at a plurality of frequencies and determine whether to actuate the at least one other moveable barrier operator or re-transmit the second signal.

2. The moveable barrier operator of claim 1 wherein the controller is programmed to re-transmit the incoming signals from the transmitter device using substantially the same frequency as the incoming signals.

3. The moveable barrier operator of claim 1 wherein the controller is programmed to re-transmit a signal from the transmitter device with a frequency different from the frequency of the incoming signals.

4. The moveable barrier operator of claim 1 wherein the controller is programmed to halt the re-transmission of a signal when a count representing signal re-transmissions reaches a predetermined threshold.

5. The moveable barrier operator of claim 4 wherein a retransmitted signal includes a marker in the signal, the marker indicating the count of re-transmissions.

6. The moveable barrier operator device of claim 1 wherein the controller is programmed to delay the re-transmitting for a time period related to a signal strength of a signal.

7. The moveable barrier operator of claim 1 wherein the controller is programmed to re-transmit the signal after a delay period from when a signal has been entirely received.

8. The moveable barrier operator of claim 7 where the delay period is determined by a characteristic selected from the group consisting of a fixed length time interval, a signal strength, and information contained within the transmission.

9. A method of operating a moveable barrier operator in an access controlled area with access controlled to the area by a barrier operated by the moveable barrier operator and the moveable barrier operator operating as a signal repeater, the method comprising:

receiving an incoming signal at a first moveable barrier operator from a mobile barrier actuating device and which incoming signal includes a security code; and if there is not a match of the security code with a stored security code at the first moveable barrier operator to actuate the barrier operator, responsively, re-transmitting the incoming signal from the first moveable barrier operator to a second moveable barrier operator in a second accessed controlled area, the second moveable barrier operator configured to responsively receive, recognize the security code at a plurality of frequencies and determine whether to actuate the second moveable barrier operator or re-transmit the incoming signal.

10. The method of claim 9 wherein re-transmitting the signal comprises re-transmitting the signal without using the incoming signal to actuate the first moveable barrier operator.

11. The method of claim 9 wherein re-transmitting the signal comprises re-transmitting a signal without substantially altering the frequency of the signal.

12. The method of claim 9 wherein re-transmitting the signal comprises re-transmitting a signal with a frequency different than a frequency of the incoming signal.

13. The method of claim 9 wherein the incoming signal has a frequency selected from the group consisting of 315 MHz and 390 MHz.

14. The method of claim 9 wherein re-transmitting a signal comprises re-transmitting a signal having a frequency selected from the group consisting of 315 MHz and 390 MHz.

15. The method of claim 9 comprising placing a marker in the signal, the marker representing a count of re-transmissions of the signal.

16. The method of claim 15 comprising halting the re-transmitting of the signal when the count reaches a predetermined threshold.

17. The method of claim 9 comprising delaying the re-transmitting for a time period related to a signal strength of the signal.

18. The method of claim 9 wherein the re-transmitting comprises re-transmitting the signal a time period after the signal has been entirely received.

19. The method of claim 18 wherein the time period is determined by a characteristic selected from the group consisting of a fixed length time interval, a signal strength, and information contained within the transmission.

20. A method for operating a movable barrier operator comprising:

transmitting a signal from a mobile barrier actuating device to a first moveable barrier operator which is responsive to a plurality of frequencies and which is in an access controlled area with access controlled to the area by a moveable barrier operated by the first barrier moveable operator, the first barrier moveable operator configured to move the moveable barrier, the signal transmission including a security code to permit actuation of a moveable barrier operator to move the barrier;

receiving the signal with the security code from the barrier actuating device at a first moveable barrier operator which is configured to receive signals at a plurality of frequencies;

determining whether there is a security code match which permits actuation of the first moveable barrier operator;

actuating the first moveable barrier operator when there is a security code match;

when there is not a security code match to permit the actuation of the first moveable barrier operator, re-transmitting the security code from the first moveable barrier operator to a second moveable barrier operator which is responsive to a plurality of frequencies and which is in a second access secured area secured by a second moveable barrier operated by the second moveable barrier; and if there is a security code match, the first barrier operator is actuated and there is no further retransmissions of the security code.

21. The method of claim 20 wherein re-transmitting the security code comprises re-transmitting the signal with the security code without substantially altering a carrier frequency of the signal.

22. The method of claim 20 wherein re-transmitting the signal comprises re-transmitting the signal with a different carrier frequency than a carrier frequency of the received signal.

23. The method of claim 20 comprising delaying the re-transmitting for a time period related to a signal strength of the signal.

24. The method of claim 20 wherein the re-transmitting comprises re-transmitting the signal a time period after the signal is entirely received.

25. The method of claim 24 where the time period is determined by a characteristic selected from the group consisting of a fixed length time interval, a signal strength, and information contained within the transmission.

26. A moveable barrier operator comprising:

a receiver device configured to be responsive to a plurality of frequencies, the receiver device at the moveable barrier operator and having an input;

a transmitter device at the moveable barrier operator having an output, the transmitter configured to transmit configured to transmit at a plurality of frequencies and configured to transmit a first security code which permits actuation of a moveable barrier operator;

a barrier positioning apparatus at the moveable barrier operator responsive to signals transmitted at a plurality of frequencies and which signals include the first security code received by the receiver and which apparatus controls access to a secured area and a position of a barrier;

a controller at the moveable barrier operator coupled to the receiver device and the transmitter device, the controller being programmed to receive a signal which includes the first security code from the receiver device and to responsively re-transmit the signal to at least one other moveable barrier operator from the transmitter device when indicated by the signal received by the controller; and the controller being programmed to retransmit the signal when the first security code does not match a stored security code stored at the moveable barrier operator, and the controller being programmed to actuate the barrier when the first security code matches the stored security code, and if there is a security code match and the first barrier operator is actuated, the controller being programmed not to further retransmit the first security code.

27. The method of claim 9 wherein the incoming signal includes a first code and comprising comparing the first security code to a stored security code and when the first security code does not match a stored security code stored at the first moveable barrier operator, retransmitting the signal and responsively actuating a barrier when the first security code matches the stored security code.

* * * * *

UNITED STATES PATENT AND TRADEMARK OFFICE

CERTIFICATE OF CORRECTION

PATENT NO. : 7,561,020 B2
APPLICATION NO. : 11/167895
DATED : July 14, 2009
INVENTOR(S) : James J. Fitzgibbon It is certified that error appears in the above-identified patent and that said Letters Patent is hereby corrected as shown below:

IN THE CLAIMS:

Claim 26, Column 8, Line 62: Delete “configured to transmit”

Signed and Sealed this

Thirteenth Day of October, 2009

David J. Kappos
*Director of the United States Patent and Trademark Office*